(12) United States Patent
Soliman et al.

(10) Patent No.: US 11,161,059 B2
(45) Date of Patent: Nov. 2, 2021

(54) CRUDE OIL DEMULSIFICATION

(71) Applicant: Saudi Arabian Oil Company, Dhahran (SA)

(72) Inventors: Mohamed Ahmed Soliman, Ras Tanura (SA); Nisar Ahmad Ansari, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/450,427

(22) Filed: Jun. 24, 2019

(65) Prior Publication Data
US 2020/0398191 A1 Dec. 24, 2020

(51) Int. Cl.
*B01D 17/06* (2006.01)
*B01D 17/04* (2006.01)
*B01D 19/00* (2006.01)

(52) U.S. Cl.
CPC .............. *B01D 17/06* (2013.01); *B01D 17/04* (2013.01); *B01D 19/0057* (2013.01)

(58) Field of Classification Search
CPC .......................... B01D 17/06; B04C 2009/001
See application file for complete search history.

(56) References Cited

U.S. PATENT DOCUMENTS

| 4,180,457 A | 12/1979 | Popp et al. |
| 4,948,393 A * | 8/1990 | Hodson ................ B01D 17/042 95/250 |
| 5,643,469 A | 7/1997 | Prevost et al. |
| 6,136,174 A * | 10/2000 | Berry ................... B01D 17/045 204/671 |
| 7,140,441 B2 | 11/2006 | Hauge et al. |
| 8,790,509 B2 | 7/2014 | Vu |

(Continued)

FOREIGN PATENT DOCUMENTS

| CN | 201735213 | 2/2011 |
| CN | 104531204 | 4/2015 |

(Continued)

OTHER PUBLICATIONS

PCT International Search Report and Written Opinion issued in International Application No. PCT/US2020/039353 dated Sep. 1, 2020, 13 pages.

(Continued)

*Primary Examiner* — Brian W Cohen
(74) *Attorney, Agent, or Firm* — Fish & Richardson P.C.

(57) ABSTRACT

A system includes a device disposed within a storage tank. The device includes a cyclonic separator and an electrostatic coalescer. The cyclonic separator is configured to receive and separate phases of a multi-phase fluid stream. The cyclonic separator is configured to induce cyclonic flow of the multi-phase fluid stream to separate the multi-phase fluid stream into a gas stream and a liquid stream. The liquid stream includes a first liquid phase and a second liquid phase. The cyclonic separator is configured to discharge at least a portion of the gas stream and at least a portion of the liquid stream. The electrostatic coalescer is downstream of and fluidically connected to the second outlet of the cyclonic separator. The electrostatic coalescer is configured to demulsify the liquid stream by causing coalescence of liquid droplets of one of the first or second liquid phases.

13 Claims, 7 Drawing Sheets

(56) References Cited

U.S. PATENT DOCUMENTS

| | | | |
|---|---|---|---|
| 2003/0150324 A1 | 8/2003 | West | |
| 2007/0267325 A1* | 11/2007 | Vu | C10G 33/00 |
| | | | 208/187 |
| 2011/0139625 A1* | 6/2011 | Arntzen | E21B 43/34 |
| | | | 204/662 |
| 2015/0014258 A1 | 1/2015 | Whitney et al. | |
| 2015/0122654 A1 | 5/2015 | Beg et al. | |
| 2017/0173499 A1 | 6/2017 | Sprenkel et al. | |

FOREIGN PATENT DOCUMENTS

| | | |
|---|---|---|
| CN | 103695029 | 8/2016 |
| CN | 106590731 | 4/2017 |
| CN | 107723020 | 2/2018 |
| EP | 2497556 | 9/2012 |

OTHER PUBLICATIONS

Devold, "Oil and gas production handbook: An introduction to oil and gas production, transport, refining and petrochemical industry," ABB, Edition 3.0 Oslo, Aug. 2013, 162 pages.

Manning and Thompson, "Oilfield Processing," Chapter 8, vol. 2, Pennwell Publishing Co, 1995, 14 pages.

Piasecki et al., "Vessel Internal Electrostatic Coalescer (Viec)," ABB Review, Apr. 2004, 4 pages.

* cited by examiner

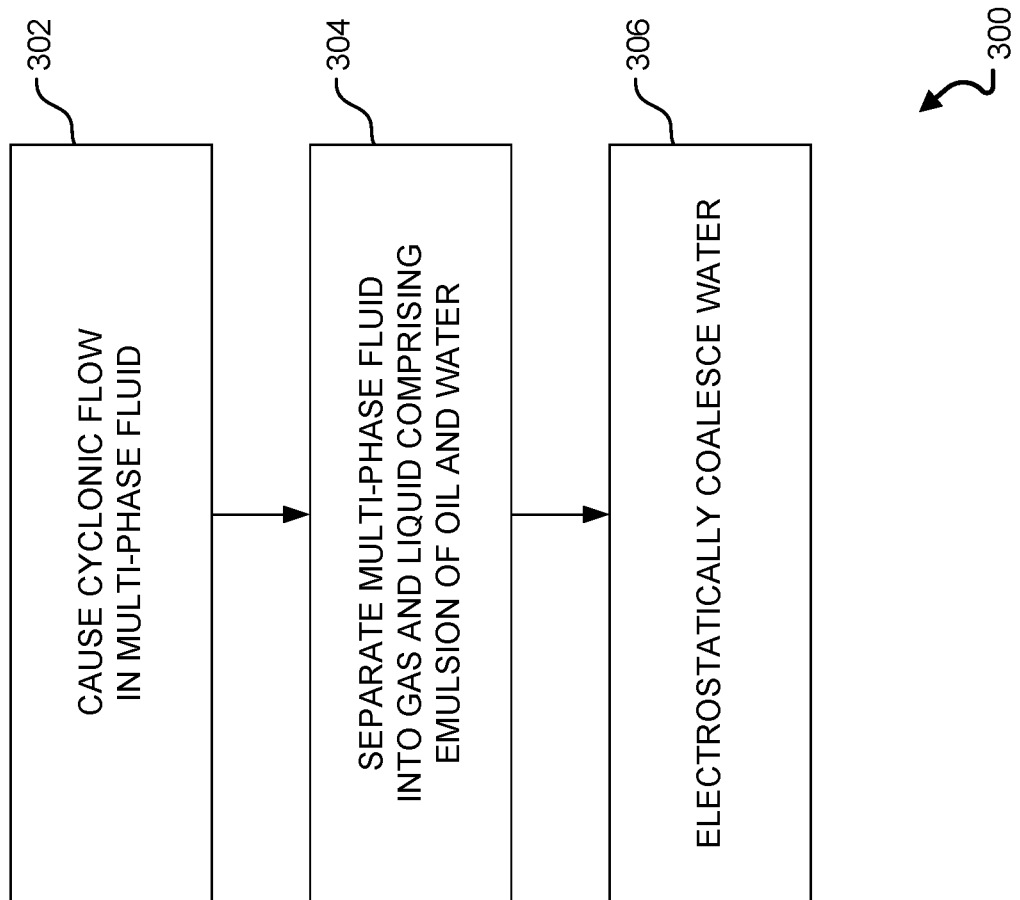

CRUDE OIL DEMULSIFICATION

TECHNICAL FIELD

This disclosure relates to separation of fluids, for example, crude oil emulsions.

BACKGROUND

Crude oil from a subterranean formation typically includes water with salt. If the water is not separated from the crude oil, the salt content can cause corrosion and deposition of salts in downstream equipment (such as pipelines and heat exchangers). It can be beneficial to demulsify the crude oil to separate the oil and water phases. Three example factors associated with crude oil demulsification include the rate at which the oil and water phases separate, the amount of water left in the crude oil after separation, and the quality of the separated water for treatment and/or disposal.

SUMMARY

This disclosure describes technologies relating to separation of fluids, and more specifically, demulsification of crude oil. Certain aspects of the subject matter described can be implemented as a system. The system includes a device disposed within a storage tank. The device includes a cyclonic separator and an electrostatic coalescer. The cyclonic separator is configured to receive and separate phases of a multi-phase fluid stream. The cyclonic separator is configured to induce cyclonic flow of the multi-phase fluid stream to separate the multi-phase fluid stream into a gas stream and a liquid stream. The liquid stream includes a first liquid phase and a second liquid phase. The cyclonic separator is configured to discharge at least a portion of the gas stream and at least a portion of the liquid stream. The electrostatic coalescer is downstream of and fluidically connected to the second outlet of the cyclonic separator. The electrostatic coalescer is configured to demulsify the liquid stream by causing coalescence of liquid droplets of one of the first or second liquid phases.

This, and other aspects, can include one or more of the following features.

The cyclonic separator can include an inlet for flowing the multi-phase fluid stream into the cyclonic separator. The inlet can be configured to induce cyclonic flow of the multi-phase fluid stream in the cyclonic separator. The inlet can be disposed tangentially to a circumference of the cyclonic separator. The cyclonic separator can include a first outlet for discharging at least the portion of the gas stream. The cyclonic separator can include a second outlet for discharging at least the portion of the liquid stream.

The electrostatic coalescer can include a housing configured to discharge coalesced liquid droplets to the storage tank.

The housing can include a tubular with an open end for discharging the coalesced liquid droplets to the storage tank.

The electrostatic coalescer can include multiple electrodes disposed within the housing. The electrostatic coalescer can include a power supply connected to the electrodes. The electrodes can be configured to produce an electric field in response to receiving power from the power supply.

Certain aspects of the subject matter described can be implemented as a method. Within a storage tank, cyclonic flow is caused in a multi-phase fluid stream through a cyclonic separator. Within the storage tank, the multi-phase fluid stream is separated into a gas stream and a liquid stream. The liquid stream includes an emulsion of oil and water. Within the storage tank, the water in the emulsion is electrostatically coalesced.

This, and other aspects, can include one or more of the following features.

The liquid stream can be flowed from the cyclonic separator to an electrostatic coalescer.

The gas stream can be flowed from the cyclonic separator into a vapor space of the storage tank through a first outlet of the cyclonic separator. The droplets of water and the oil can be discharged from the electrostatic coalescer to the storage tank.

Electrostatically coalescing the water in the liquid stream can include supplying power to an electrode of the electrostatic coalescer.

Flowing the liquid stream from the cyclonic separator to the electrostatic coalescer can include flowing the liquid stream through a second outlet of the cyclonic separator to the electrostatic coalescer.

The cyclonic separator and the electrostatic coalescer can be disposed within the storage tank.

The second outlet of the cyclonic separator can be connected to the electrostatic coalescer.

Certain aspects of the subject matter described can be implemented as a system. The system includes a storage tank and a device disposed within the storage tank. The device includes a cyclonic separator and an electrostatic coalescer. The cyclonic separator is configured to receive and separate a multi-phase fluid stream into a gas stream and a liquid stream. The cyclonic separator includes a conical housing, an inlet, and a tubular. The conical housing includes a first end, a second end smaller than the first end, and a lateral surface between the first end and the second end. The first end, the second end, and the lateral surface define an inner volume of the cyclonic separator. The inlet is disposed tangentially to a circumference of the lateral surface of the conical housing. The inlet is configured to receive the multi-phase fluid stream. The tubular penetrates the first end of the conical housing and extends into the inner volume of the cyclonic separator. The tubular is configured to discharge at least a portion of the gas stream from the cyclonic separator. The second end of the conical housing is configured to discharge at least a portion of the liquid stream from the cyclonic separator. The electrostatic coalescer is downstream of and fluidically connected to the second end of the conical housing. The electrostatic coalescer is configured to cause coalescence of liquid droplets in the portion of the liquid stream. The electrostatic coalescer includes a housing, a power supply, and multiple electrodes disposed within the housing. The housing includes an open end configured to discharge the coalesced liquid droplets of the portion of the liquid stream to the storage tank. The electrodes are connected to the power supply. The electrodes are configured to produce an electric field in response to receiving power from the power supply.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIG. 3 is a flow chart of an example method for fluid separation.

DETAILED DESCRIPTION

This disclosure describes crude oil demulsification. The crude oil can be demulsified by one or more processes, such as cyclonic separation and electrostatic coalescence. The subject matter described in this disclosure can be implemented, so as to realize one or more of the following advantages. A device including a cyclonic separator and an electrostatic coalescer can be disposed within a storage tank to demulsify the crude oil within the storage tank. The large residence and settling times in storage tanks (for example, residence times ranging from about 30 minutes to about 90 minutes) allow for effective use of the electrostatic coalescer. This is in contrast to conventional gravity separation tanks which, in some cases, experience turbulence and slugging, both of which negatively affect coalescence. Implementation of the subject matter described in this disclosure can allow for smaller downstream processing equipment (such as a wet crude oil dehydrator, heat exchangers, pumps, and vessels), thereby resulting in capital cost savings. The use of the device in the storage tank can allow for the storage tank to be smaller in size in comparison to storage tanks without the device. The use of the device can also result in operating cost savings, as water can be separated from the crude oil upstream of the wet crude oil dehydrator, thereby reducing heating requirements.

Figure 1A:
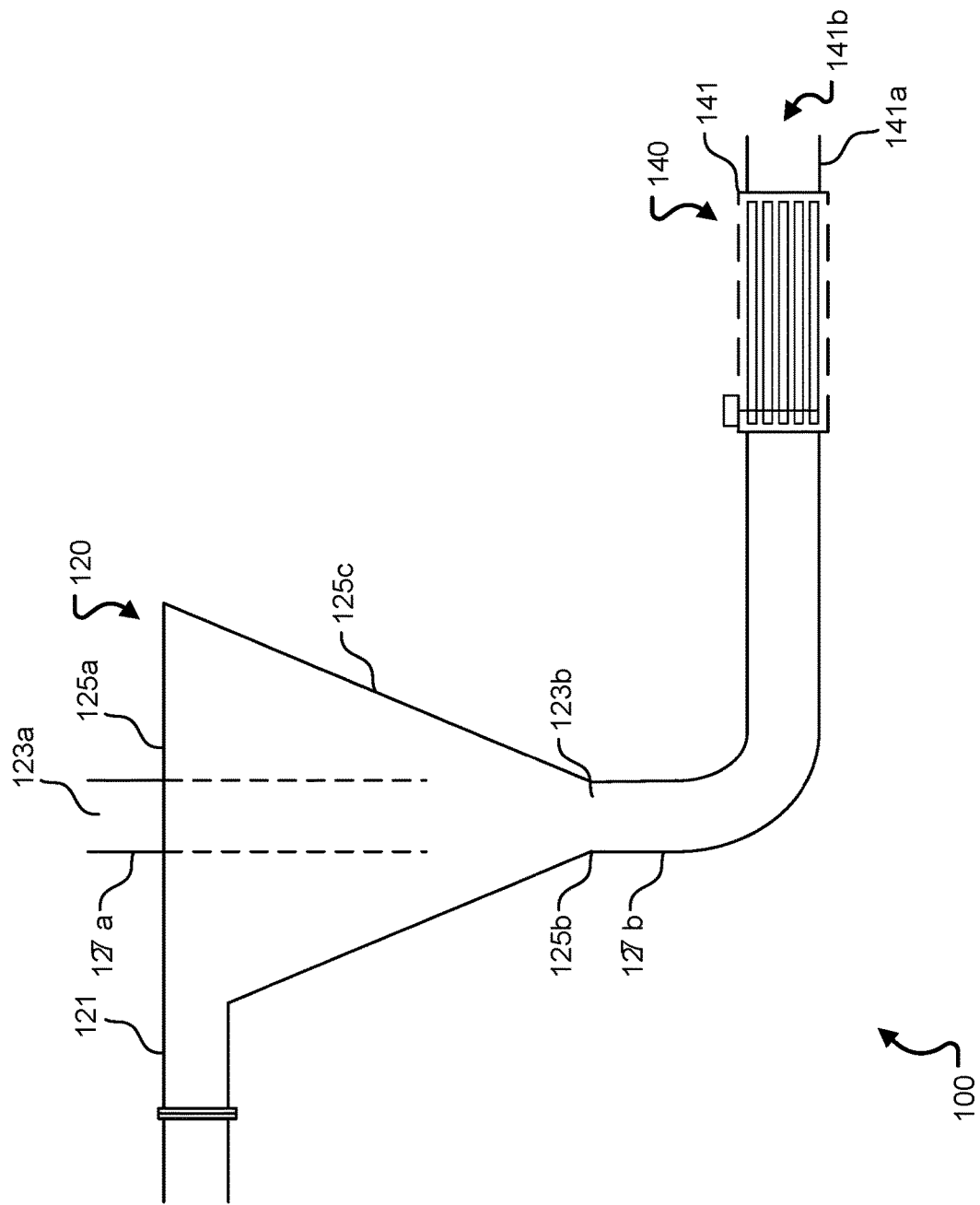
FIG. 1A is a schematic diagram of an example device for fluid separation.

FIG. 1A is a schematic diagram of an example device 100 for fluid separation. The device 100 can be used, for example, to demulsify crude oil. The device includes a cyclonic separator 120 and an electrostatic coalescer 140. The device can be disposed within a storage tank. The storage tank can have a total storage volume in a range of from about 2,000 barrels to about 20,000 barrels. The total storage volume of the storage tank can depend on the desired residence time and on characteristics of the crude oil. The cyclonic separator 120 is configured to receive and separate phases of a multi-phase fluid stream. The cyclonic separator 120 can include a frusto-conical housing. The frusto-conical housing can include a first end 125a, a second end 125b smaller than the first end 125a (with respect to diameter), and a lateral surface 125c between the first end 125a and the second end 125b. The first end 125a, the second end 125b, and the lateral surface 125c define an inner volume of the cyclonic separator 120.

Figure 1B:
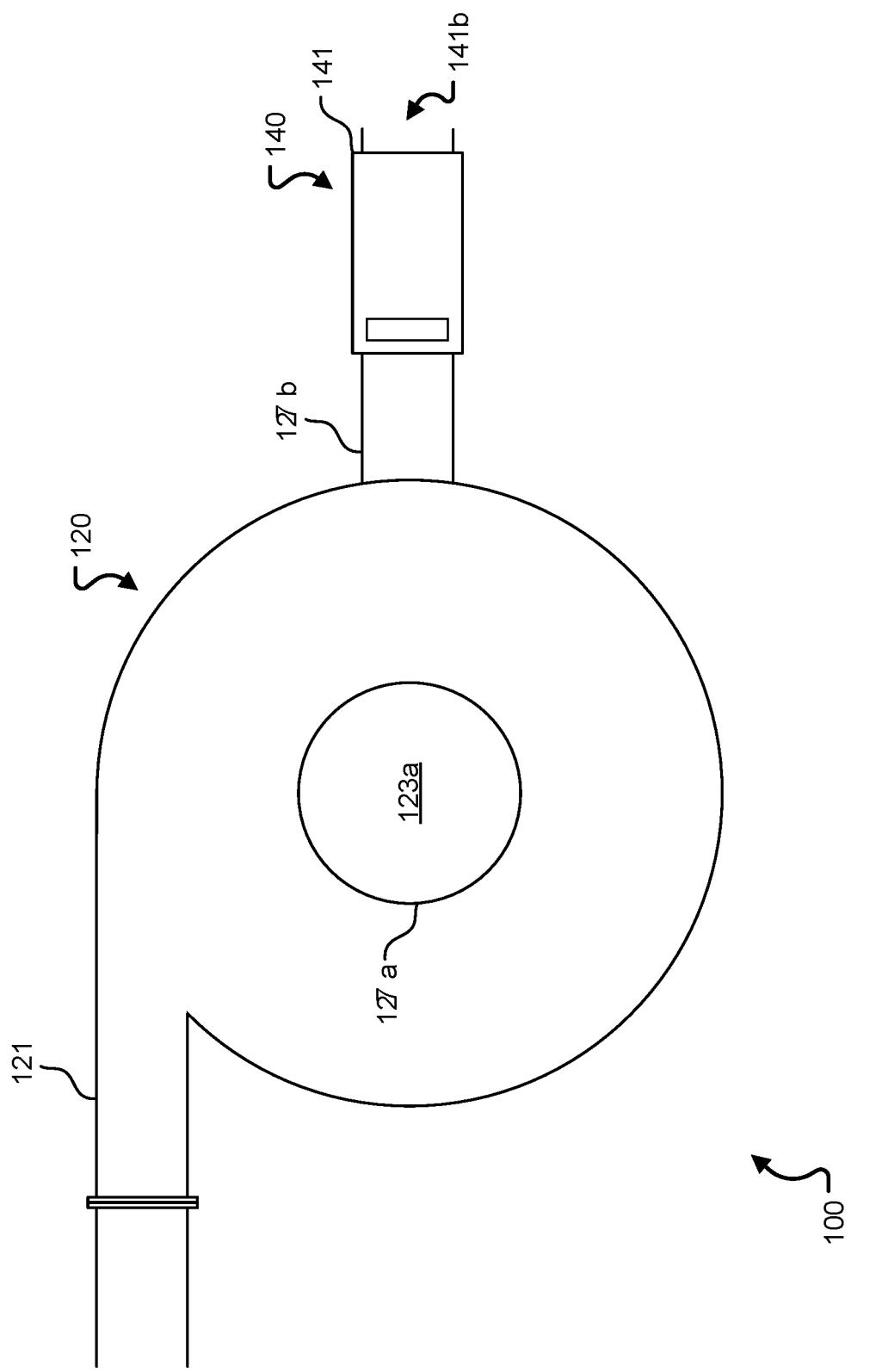
FIG. 1B is a top view of the device of FIG. 1A.

FIG. 1B shows a top view of the device 100 shown in FIG. 1A. The cyclonic separator 120 includes an inlet 121 for receiving and flowing the multi-phase fluid stream into the cyclonic separator 120. The inlet 121 is configured to induce cyclonic flow of the multi-phase fluid stream in the cyclonic separator 120 to separate the multi-phase fluid stream into a gas stream and a liquid stream. As shown, the inlet 121 can be disposed tangentially to a circumference of the cyclonic separator 120. For example, the inlet 121 is disposed tangentially to the lateral surface 125c of the cyclonic separator 120. Such disposition of the inlet 121 can induce the cyclonic flow of the multi-phase fluid stream in the cyclonic separator 120.

Referring back to FIG. 1A, the cyclonic separator 120 includes a first outlet 123a for flowing at least a portion of the gas stream separated from the multi-phase fluid stream. The first outlet 123a can include a tubular 127a penetrating the first end of the conical housing and extending into the inner volume of the cyclonic separator 120. The cyclonic separator 120 includes a second outlet 123b for flowing at least a portion of the liquid stream separated from the multi-phase fluid stream.

The cyclonic flow of the multi-phase fluid stream in the cyclonic separator 120 can cause phases of the multi-phase fluid stream to separate in the cyclonic separator 120. Cyclonic flow can be described as flow of fluid in a substantially helical pattern. The cyclonic flow can cause the heavier (that is, denser) phase(s) of the multi-phase fluid stream to flow along a lateral (that is, circumferential) surface of the cyclonic separator 120, while the lighter (that is, less dense) phase(s) flow closer to the central, longitudinal axis of the cyclonic separator 120. For example, if the multi-phase fluid stream includes gas, oil, and water, then the gas (the lightest phase) can be separated from the other components in the cyclonic separator 120 and flow out of the first outlet 123a, and the oil and water can flow out of the second outlet 123b. The oil and water (the heavier phases) can flow out of the second outlet 123b in the form of an emulsion (that is, water dispersed in oil or vice versa).

The electrostatic coalescer 140 is downstream of and fluidically connected to the second outlet 123b of the cyclonic separator 120. The electrostatic coalescer 140 can be connected to the second outlet 123b by a tubular 127b. The liquid stream flowing out of the second outlet 123b can flow through the tubular 127b to the electrostatic coalescer 140. The electrostatic coalescer 140 is configured to cause coalescence of liquid droplets in the portion of the liquid stream. Coalescence of liquid droplets involves merging of liquid droplets. The electrostatic coalescer 140 can generate an electric field. The generated electric field can cause coalescence of liquid droplets. For example, for an emulsion of water in oil, the electrostatic coalescer 140 can cause the water droplets to coalesce, thereby demulsifying the water and oil. The water present in crude oil typically has salt content. The generated electric field can induce dipole moments in the water droplets and cause the water droplets to be attracted to each other (in other words, cause coalescence of the water droplets).

The electrostatic coalescer 140 can include a housing 141 configured to discharge coalesced liquid droplets to the storage tank (not shown). In some implementations, the housing 141 includes a tubular 141a with an open end 141b for discharging the coalesced droplets to the storage tank.

Figure 1C:
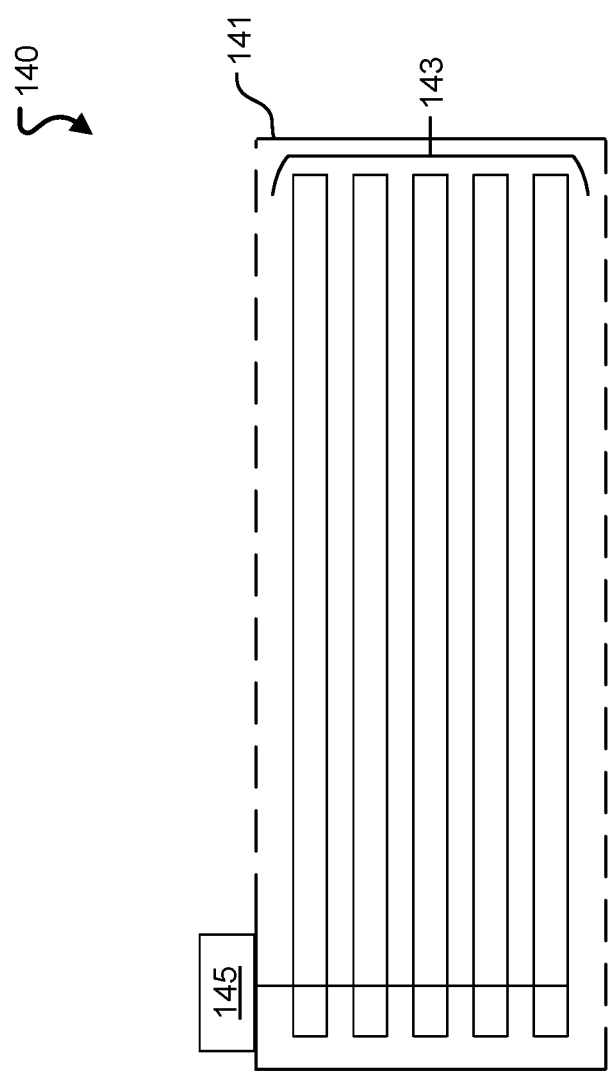
FIG. 1C is a schematic diagram of an example electrostatic coalescer of the device of FIG. 1A.

FIG. 1C illustrates a more detailed view of the electrostatic coalescer 140 that is part of the device 100. The electrostatic coalescer 140 can include multiple electrodes 143 disposed within the housing 141. Although shown in FIG. 1C as including five electrodes 143, the electrostatic coalescer 140 can include fewer electrodes (for example, two, three, or four electrodes) or more electrodes (for example, six electrodes or more than six electrodes). The number of electrodes 143 included in the electrostatic coalescer 140 can depend on one or more factors, such as flow rate of crude oil to the device 100, physical properties of the crude oil flowed to the device 100, composition of the crude oil flowed to the device 100, and temperature of the crude oil flowed to the device 100. The electrostatic coalescer 140 can include a power supply 145 connected to the electrodes 143. The electrodes 143 are configured to produce an electric field in response to receiving power from the power supply 145. In some implementations, the power supply 145 provides power at a voltage in a range of from 400 volts (V) to 16,000V. One or more of the components of the electrostatic coalescer 140 (for example, the power supply 145) can be insulated to avoid short-circuiting and arcing faults.

Figure 1D:
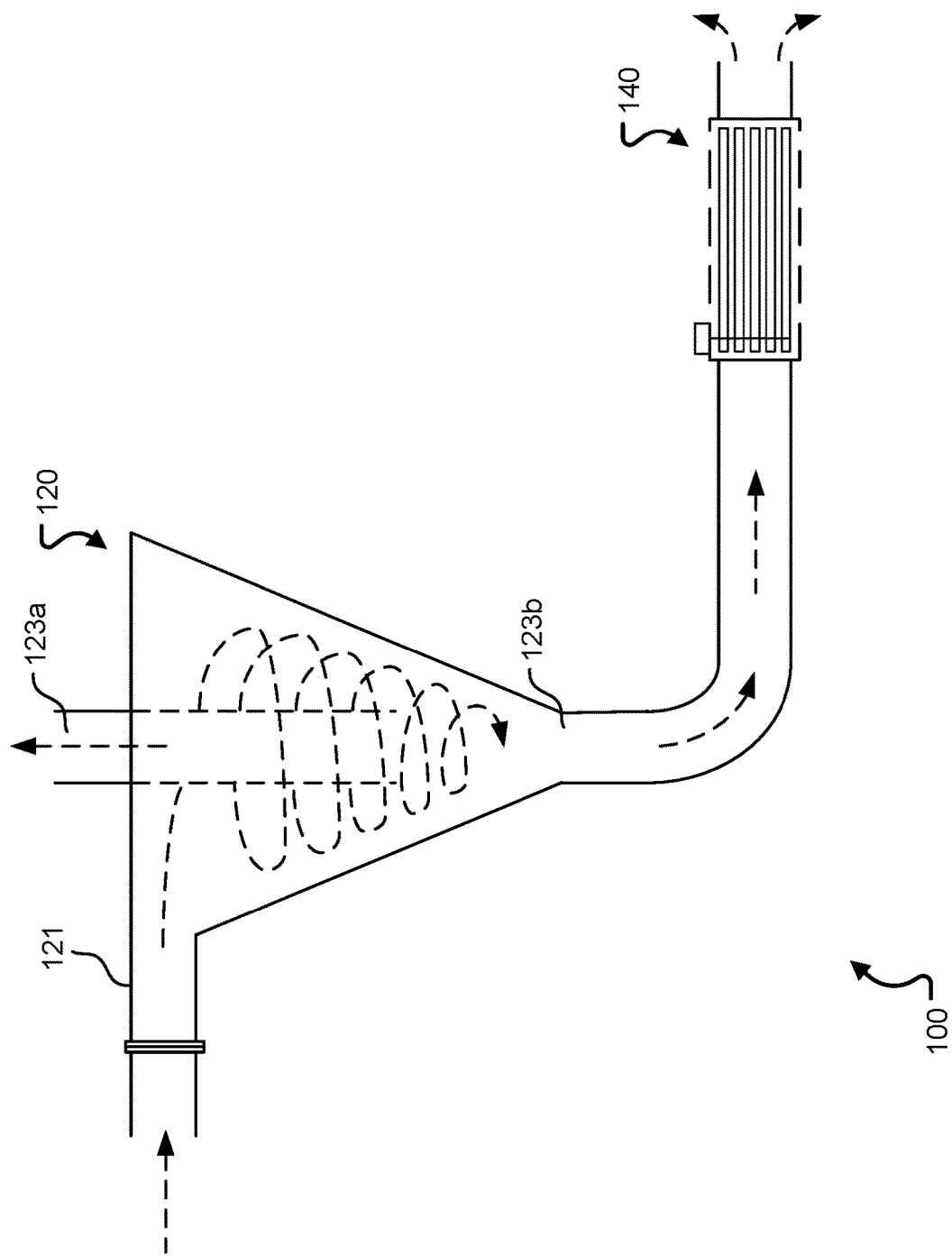
FIG. 1D is a schematic diagram showing an example of flow through the device of FIG. 1A.
Figure 1E:
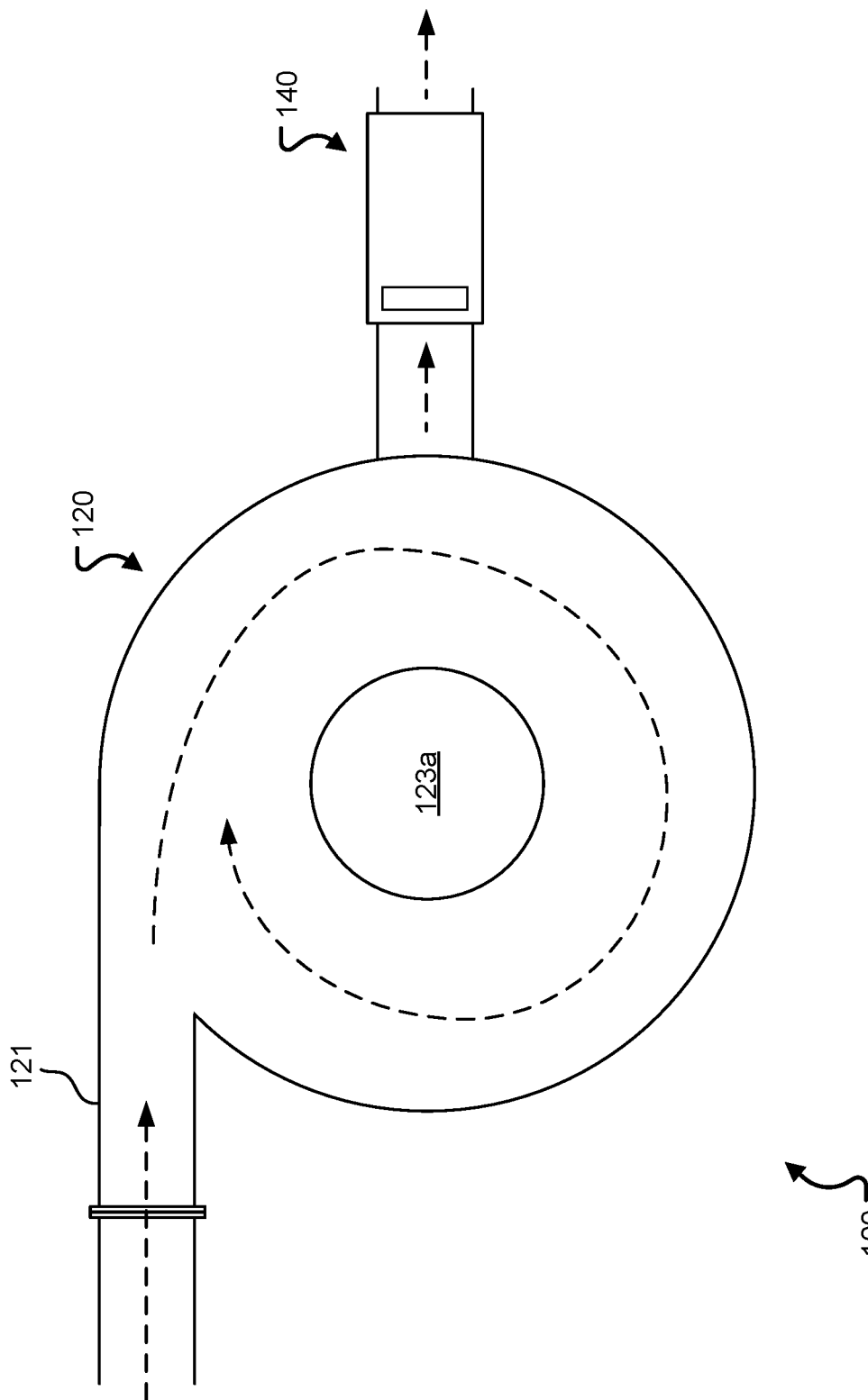
FIG. 1E is a top view showing an example of flow through the device of FIG. 1A.

FIGS. 1D and 1E illustrate an example of the flow of fluid (dotted arrows) through the device 100. A multi-phase fluid stream can be, for example, crude oil including water with dissolved salt. The crude oil can be from, for example, a wellhead or a flow line. The multi-phase fluid stream enters the device 100 via inlet 121. The multi-phase fluid stream flows cyclonically in the cyclonic separator 120. Gas from the multi-phase fluid stream can exit the cyclonic separator 120 through the first outlet 123a. Liquid from the multi-phase fluid stream (for example, water, oil, or a mixture of both) can exit the cyclonic separator 120 through the second outlet 123a and flow to the electrostatic coalescer 140. The electrostatic coalescer 140 can cause demulsification, and the separated liquid phases can discharge from the device 100 and into the storage tank (not shown). The lighter liquid phase (for example, the crude oil) can form a layer on top of the heavier liquid phase (for example, the water including salt).

Figure 2:
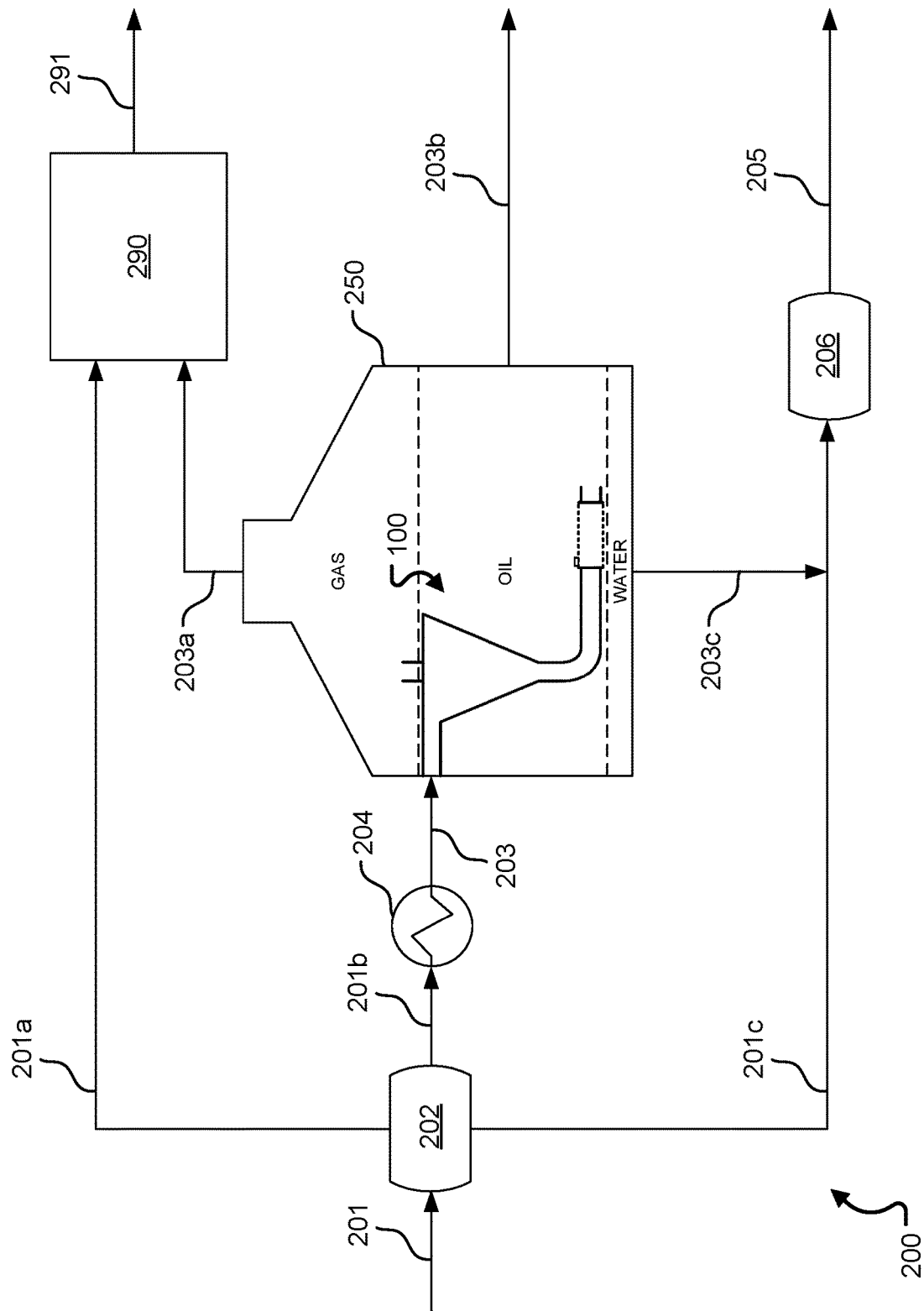
FIG. 2 is a schematic diagram of an example system including the device of FIG. 1A.

FIG. 2 shows a system 200 in which the device 100 is disposed within a storage tank 250. A crude oil stream 201 can include a mixture of crude oil and water. In some cases, the crude oil stream 201 includes entrained gas, dissolved gas, or both. The water can include salt (for example, in the form of dissolved salt in the water). The crude oil stream 201 can be flowed to a separator 202. The separator 202 can be, for example, an American Petroleum Institute (API) oil-water separator. Gas 201a from the crude oil stream 201 (for example, any gas entrained or dissolved in the crude oil stream 201) can be discharged from the separator 202 and flowed to a gas compression unit 290, which can compress and process gas for delivery, for example, to a pipeline, or another downstream processing unit. The lighter liquid phase 201b of the crude oil stream 201 (for example, the crude oil) that is separated in the separator 202 can be flowed to a heater 204. The heavier liquid phase 201c of the crude oil stream 201 (for example, the water including salt) that is separated in the separator 202 can be flowed to another separator 206.

It is noted that the crude oil stream 201 may not completely separate into the gas phase, the lighter liquid phase, and the heavier liquid phase in the separator 202. For example, some gas may still remain in the lighter liquid phase 201b, the heavier liquid phase 201c, or both. For example, some of the heavier liquid (water including salt) may still remain in the lighter liquid phase 201b. Therefore, in some implementations, the lighter liquid phase 201b includes an emulsion of crude oil and water (and in some cases, dissolved gas).

The heater 204 can improve the separation of gas from the lighter liquid phase 201b. In some implementations, the heater 204 causes one or more components in the lighter liquid phase 201b to flash (evaporate). The heated lighter liquid phase 203 can flow to the device 100. Gas from the heated lighter liquid phase 203 can be discharged from the device 100 (for example, from the first outlet 123a of the cyclonic separator 120) and into the vapor space of the storage tank 250. Gas from the storage tank 250 can be flowed to the gas compression unit 290.

The device 100, as described previously, can cause coalescence of water droplets in the oil-water emulsion, thereby promoting separation of the lighter and heavier liquid phases. The lighter phase (oil) can settle as a layer on top of the heavier phase (water) within the storage tank 250. The crude oil from the storage tank 250 can be flowed as a "dry" crude oil stream 203b for delivery, for example, to a pipeline, or another downstream processing unit (such as a refining unit). The water from the storage tank 250 can be flowed as a water stream 203c to the separator 206. The water stream 205 from the separator 206 can be, for example, disposed or flowed to a water treatment unit (not shown). In implementations where the water stream 205 is flowed to a water treatment unit, the water treatment unit can treat the water stream 205, such that it is suitable for disposal or injection into a reservoir.

FIG. 3 is a flow chart for an example method 300, which can be implemented to demulsify crude oil. The method 300 can be implemented with the device 100 disposed within the storage tank 250. At step 302, cyclonic flow is caused in a multi-phase fluid stream through a cyclonic separator (120). The cyclonic flow can be induced by the inlet 121 of the cyclonic separator 120 because the inlet 121 is disposed tangentially to a circumference of the cyclonic separator 120.

At step 304, the multi-phase fluid stream is separated into a gas stream and a liquid stream. The multi-phase fluid stream can be separated in the cyclonic separator 120. The liquid stream can include an emulsion of oil and water. The water can include salt. The gas stream can be discharged from the first outlet 123a of the cyclonic separator 120. The gas stream can be flowed from the cyclonic separator 120 into a vapor space of the storage tank 250 through the first outlet 123a of the cyclonic separator 120. The liquid stream can be discharged from the second outlet 123b of the cyclonic separator 120. The liquid stream can be flowed from the cyclonic separator 120 to the electrostatic coalescer 140. The liquid stream can be flowed from the cyclonic separator 120 to the electrostatic coalescer 140 through the second outlet 123b of the cyclonic separator 120.

At step 306, the water in the emulsion is electrostatically coalesced. That is, the water droplets are coalesced together to promote separation of the oil and the water (demulsification). The water droplets can be coalesced with the electrostatic coalescer 140. Power can be supplied to one or more electrodes 143 to generate an electric field. As described previously, the electric field can induce dipole moments in the water droplets because of the ions in the water (from the dissolved salt). The induced dipole moments causes the water droplets to become attracted to one another, thereby resulting in coalescence of the water droplets. The coalesced water and the oil can be discharged from the electrostatic coalescer 140 to the storage tank 250.

In some implementations, the method 300 includes disposing the device (including the cyclonic separator 120 and the electrostatic coalescer 140) within the storage tank 250 before step 302. In some implementations, the method 300 includes connecting the second outlet 123b of the cyclonic separator 120 to the electrostatic coalescer 140.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" means a deviation or allowance of up to 10 percent (%) and any variation from a mentioned value is within the tolerance limits of any machinery used to manufacture the part. Likewise, "about" and "substantially" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A method comprising:
   flowing a multi-phase fluid stream into a storage tank within which a cyclonic separator and an electrostatic coalescer are disposed, the cyclonic separator and the electrostatic coalescer fluidically coupled to each other by a tubular that directly connects the cyclonic separator to the electrostatic coalescer;
   flowing the multi-phase fluid stream through the cyclonic separator, thereby causing cyclonic flow in the multi-phase fluid stream through the cyclonic separator;
   separating, by the cyclonic separator, the multi-phase fluid stream into a gas stream and a liquid stream comprising an emulsion of oil and water;
   flowing the liquid stream from the cyclonic separator through the tubular to the electrostatic coalescer;
   electrostatically coalescing, by the electrostatic coalescer, the water in the emulsion to promote separation of a lighter liquid phase comprising the oil and a heavier liquid phase comprising the water;
   discharging the lighter liquid phase and the heavier liquid phase from the electrostatic coalescer to the storage tank; and
   separating, within the storage tank, the lighter liquid phase and the heavier liquid phase, thereby causing the lighter liquid phase to form a layer on top of the heavier liquid phase within the storage tank within which the cyclonic separator and the electrostatic coalescer are disposed.

2. The method of claim 1, wherein the cyclonic separator comprises a frusto-conical housing, and wherein the tubular directly connects an outlet of the cyclonic separator to an inlet of the electrostatic coalescer.

3. The method of claim 1, comprising:
   flowing the gas stream from the cyclonic separator into a vapor space of the storage tank through a first outlet of the cyclonic separator; and
   discharging the droplets of water and the oil from the electrostatic coalescer within the storage tank.

4. The method of claim 3, wherein electrostatically coalescing the water in the liquid stream comprises supplying power to an electrode of the electrostatic coalescer.

5. The method of claim 4, wherein flowing the liquid stream from the cyclonic separator through the tubular to the electrostatic coalescer comprises flowing the liquid stream from a second outlet of the cyclonic separator through the tubular to the electrostatic coalescer.

6. The method of claim 5, further comprising, before flowing the multi-phase fluid stream through the cyclonic separator, disposing the cyclonic separator and the electrostatic coalescer within the storage tank.

7. The method of claim 5, wherein the second outlet of the cyclonic separator is connected to the electrostatic coalesce via the tubular.

8. The method of claim 3, further comprising flowing the gas stream from the vapor space of the storage tank to a gas compression unit.

9. The method of claim 1, further comprising, before flowing the multi-phase fluid stream through the cyclonic separator, flowing the multi-phase fluid stream to a heater, thereby causing one or more components of the multi-phase fluid stream to evaporate.

10. The method of claim 1, wherein the gas stream is a second gas stream, and the method further comprises, before flowing the multi-phase fluid stream through the cyclonic separator:
    flowing a crude oil stream to a first separator;
    separating, by the first separator, the crude oil stream into a first gas stream, the multi-phase fluid stream, and a heavier liquid stream.

11. The method of claim 10, further comprising flowing the first gas stream to a gas compression unit and flowing the second gas stream from the vapor space of the storage tank to the gas compression unit.

12. The method of claim 10, further comprising, before flowing the multi-phase fluid stream through the cyclonic separator, flowing the multi-phase fluid stream to a heater, thereby causing one or more components of the multi-phase fluid stream to evaporate.

13. The method of claim 10, further comprising flowing the heavier liquid stream to a second separator and flowing the heavier liquid phase from the storage tank to the second separator.

* * * * *